United States Patent
Kozloski et al.

(10) Patent No.: US 10,594,811 B2
(45) Date of Patent: *Mar. 17, 2020

(54) ENHANCING NATURAL LANGUAGE PROCESSING QUERY/ANSWER SYSTEMS USING SOCIAL NETWORK ANALYSIS

(71) Applicant: INTERNATIONAL BUSINESS MACHINES CORPORATION, Armonk, NY (US)

(72) Inventors: James R. Kozloski, New Fairfield, CT (US); Clifford A. Pickover, Yorktown Heights, NY (US); Valentina Salapura, Chappaqua, NY (US); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 701 days.

This patent is subject to a terminal disclaimer.

(21) Appl. No.: 14/744,253

(22) Filed: Jun. 19, 2015

(65) Prior Publication Data

US 2016/0292582 A1 Oct. 6, 2016

Related U.S. Application Data

(63) Continuation of application No. 14/679,665, filed on Apr. 6, 2015.

(51) Int. Cl.
*H04L 29/08* (2006.01)
*G06N 5/04* (2006.01)
(Continued)

(52) U.S. Cl.
CPC .......... *H04L 67/22* (2013.01); *G06F 17/2775* (2013.01); *G06N 5/048* (2013.01);
(Continued)

(58) Field of Classification Search
CPC ................. G06N 5/04; G06N 5/02; G06N 5/022; G06Q 50/01
See application file for complete search history.

(56) References Cited

U.S. PATENT DOCUMENTS 7,788,260 B2    8/2010    Lunt et al.
7,809,664 B2    10/2010    Heck
(Continued)

FOREIGN PATENT DOCUMENTS

| EP | 1700421 | 4/2007 |
|---|---|---|
| WO | WO2006036165 | 4/2006 |
| WO | WO2011008145 | 1/2011 |

OTHER PUBLICATIONS

Chen et al, Leveraging the network information for evaluating answer quality in a collaborative question answering portal, 2011.*
(Continued)

*Primary Examiner* — Li B. Zhen
*Assistant Examiner* — Mikayla Chubb
(74) *Attorney, Agent, or Firm* — Tutunjian & Bitetto, P.C.; Vazken Alexanian

(57) ABSTRACT

Methods and a system are provided. A method includes optimizing, by a natural language processing based response optimizer having a processor, responses in an online question and answer session using natural language processing. The optimizing step includes deriving a candidate answer to a question posed in natural language and gathering support for the candidate answer by accessing a social network. The support is weighted by at least one of degree centrality, betweenness centrality, closeness centrality, Eigenvalue, hub, and authority of nodes in the social network that are associated with the support.

18 Claims, 9 Drawing Sheets

(51) Int. Cl.
  *G06F 17/27* (2006.01)
  *G06Q 50/00* (2012.01)
  *G06Q 30/02* (2012.01)
  *G06N 20/00* (2019.01)
  *G06N 5/02* (2006.01)

(52) U.S. Cl.
  CPC ......... *G06N 20/00* (2019.01); *G06Q 30/0203* (2013.01); *G06Q 50/01* (2013.01); *G06N 5/022* (2013.01)

(56) References Cited

U.S. PATENT DOCUMENTS

| | | | |
|---|---|---|---|
| 8,275,803 | B2 | 9/2012 | Brown et al. |
| 8,515,888 | B2 | 8/2013 | Ventilla et al. |
| 8,935,192 | B1* | 1/2015 | Ventilla .................... G06N 5/04 706/45 |
| 2008/0215541 | A1 | 9/2008 | Li et al. |
| 2008/0307320 | A1* | 12/2008 | Payne .................... G06F 3/0481 715/751 |
| 2009/0287678 | A1 | 11/2009 | Brown et al. |
| 2011/0125734 | A1* | 5/2011 | Duboue .................... G09B 7/00 707/723 |
| 2012/0278476 | A1 | 11/2012 | Agrawal et al. |
| 2013/0066886 | A1* | 3/2013 | Bagchi .............. G06F 17/30654 707/749 |
| 2013/0085970 | A1 | 4/2013 | Karnik et al. |
| 2013/0158984 | A1* | 6/2013 | Myslinski ............... G06F 17/28 704/9 |
| 2014/0214467 | A1* | 7/2014 | Asur .............. G06Q 10/063112 705/7.14 |
| 2015/0178267 | A1* | 6/2015 | Heo .................. G06F 17/30684 707/722 |
| 2015/0248736 | A1* | 9/2015 | Myslinski .............. G06Q 50/01 705/319 |

OTHER PUBLICATIONS

Erkan et al, LexRank: Graph-based Lexical Centrality as Salience in Text Summarization, 2004.*
Borgatti et al, A Graph-theoretic perspective on centrality (Year: 2006).*
Callison-Burch, et al., "A Natural Language Question and Answer System", Jun. 2000, pp. -13.
Gondek, et al., IBM J. Res & Dev., "A Framework for Merging and Ranking of Answers in DeepQA", May 2012, pp. 1-12, vol. 56, No. 3/4.
Horowitz, et al., International Word Wide Web Conference Committee (IW3C2), "The Anatomy of a Large-Scale Social Search Engine", Apr. 2010, pp. 431-440.
Kajino, "Clustering Crowds", Proceedings of the 27th AAAI Conference on Artificial Intelligence, Jul. 2013, pp. 1120-1127.
Yan, et al., "Active Learning From Crowds", Proceedings of the 28th International Conference of Machine Learning, Jun. 2011, 8 Pages.
Zimmerman, T.G., "Personal Area Networks: Near-Field Intrabody Communication", IBM Systems Journal Apr. 1996, pp. 609-617, vol. 35, Nos. 3&4.
http://www-.03.ibm.com/ibm/history/ibm100/us/en/icons/watson/breakthroughs/, IBM100—"A Computer Called Watson", Apr. 2009 pp. 1-2.
http://www.fmsasg.con/socialnetworkanalysis/, Social Network Analysis (SNA) Software with Sentinel Visualizer Diagrams, 2001, pp. 1-4.
List of IBM Patents or Patent Applications Treated as Related.

* cited by examiner

ENHANCING NATURAL LANGUAGE PROCESSING QUERY/ANSWER SYSTEMS USING SOCIAL NETWORK ANALYSIS

CROSS-REFERENCE TO RELATED APPLICATIONS

This application is a Continuation application of co-pending U.S. patent application Ser. No. 14/679,665 filed on Apr. 6, 2015 incorporated herein by reference in its entirety.

BACKGROUND

Technical Field

The present invention relates generally to the field of query/answer systems in Natural Language Processing and, in particular, to the field of enhancing the Natural Language Processing for Question Answering systems.

Description of the Related Art

A Question Answering (QA) system builds on search engine technology to provide a single answer to a question posed to it in natural language. The QA system answers the natural language questions by querying data repositories and applying elements of language processing, information retrieval, and machine learning to arrive at a conclusion. Whereas a search engine uses document retrieval to return a list of results for a query, a QA system must find the one best answer. As used herein, a QA system refers to an online question answering system that uses Natural Language Processing (NLP) to read and understand the free-form questions presented to it. NLP falls under the realm of artificial intelligence (AI) and is gaining momentum in understanding the human language.

One particularly brilliant example of a QA system using NLP is "Watson", a system designed by IBM on their DeepQA technology. Watson's extraordinary abilities were showcased on the quiz show "Jeopardy!" in 2011 when Watson beat two defending "Jeopardy!" champions. The manner in which QA systems such as Watson arrive at an answer is complex and involves hundreds of algorithms that return candidate answers. The candidate answers are "scored" to arrive at a presumed "best" answer. Then, the confidence level of that answer is determined. Adhering to the phenomenon known as "the wisdom of the crowds", where the collective knowledge of the many is greater than one individual's knowledge, an answer will have a high confidence level if that answer was returned as the candidate answer by multiple algorithms.

SUMMARY

According to an aspect of the present principles, a method is provided. The method includes optimizing, by a natural language processing based response optimizer having a processor, responses in an online question and answer session using natural language processing. The optimizing step includes deriving a candidate answer to a question posed in natural language and gathering support for the candidate answer by accessing a social network. The support is weighted by at least one of degree centrality, betweenness centrality, closeness centrality, Eigenvalue, hub, and authority of nodes in the social network that are associated with the support.

According to another aspect of the present principles, a system is provided. The system includes a natural language processing based response optimizer for optimizing responses in an online question and answer session using natural language processing, by deriving a candidate answer to a question posed in natural language and gathering support for the candidate answer by accessing a social network. The support is weighted by at least one of degree centrality, betweenness centrality, closeness centrality, Eigenvalue, hub, and authority of nodes in the social network that are associated with the support.

According to yet another aspect of the present principles, a method is provided. The method includes performing active learning using a machine learning question answering system. The performing step includes directing active learning to particular nodes from among a plurality of nodes in a social network based on at least one of degree centrality, betweenness centrality, closeness centrality, Eigenvalue, hub, and authority of nodes in the social network that are associated with a candidate answer.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to enhancing natural language processing (NLP) for question answering (QA) systems. In an embodiment, the preset principles use social network analysis to enhance the NLP for the QA systems.

Figure 1:
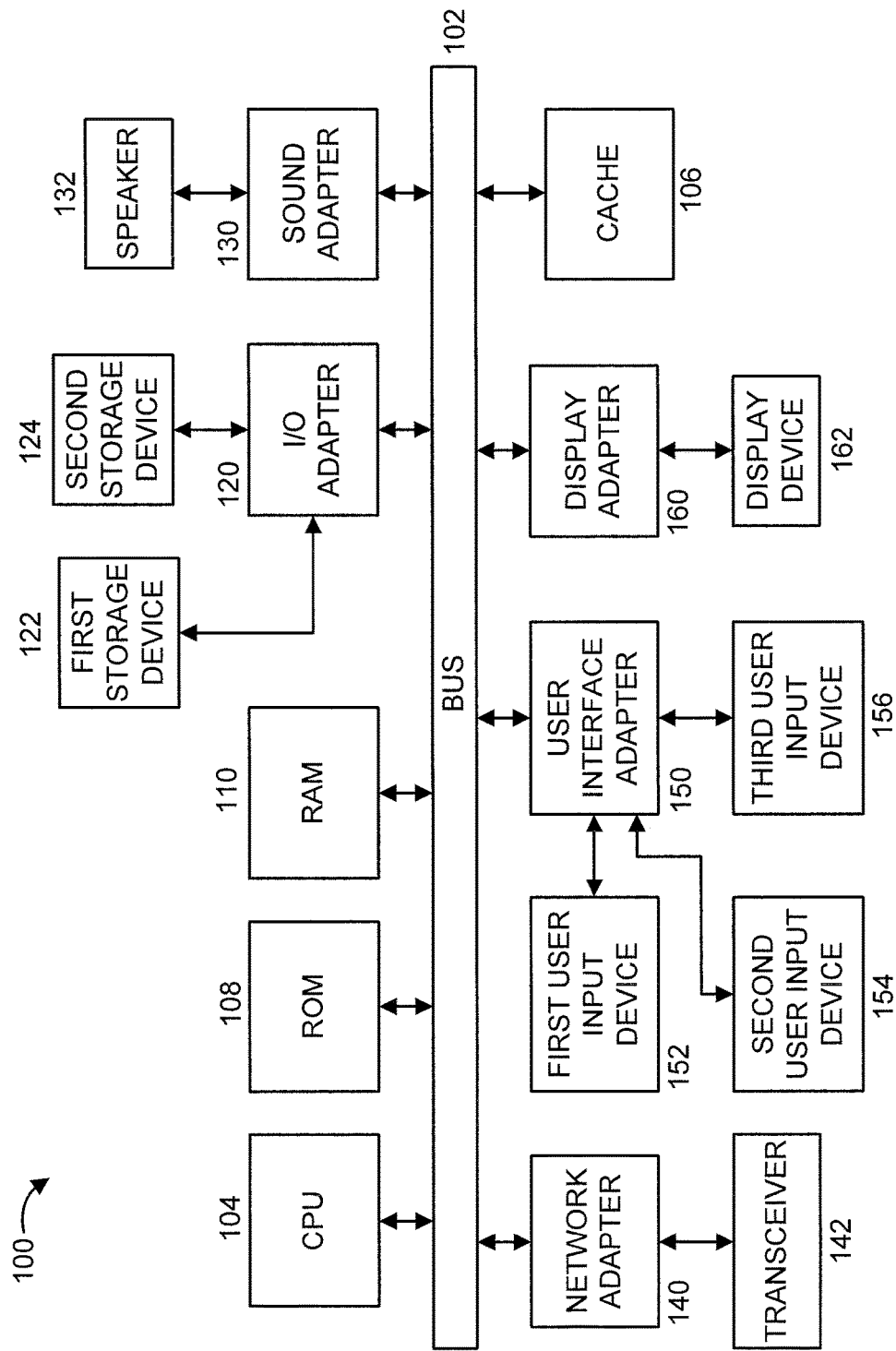
FIG. 1 is a block diagram showing an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
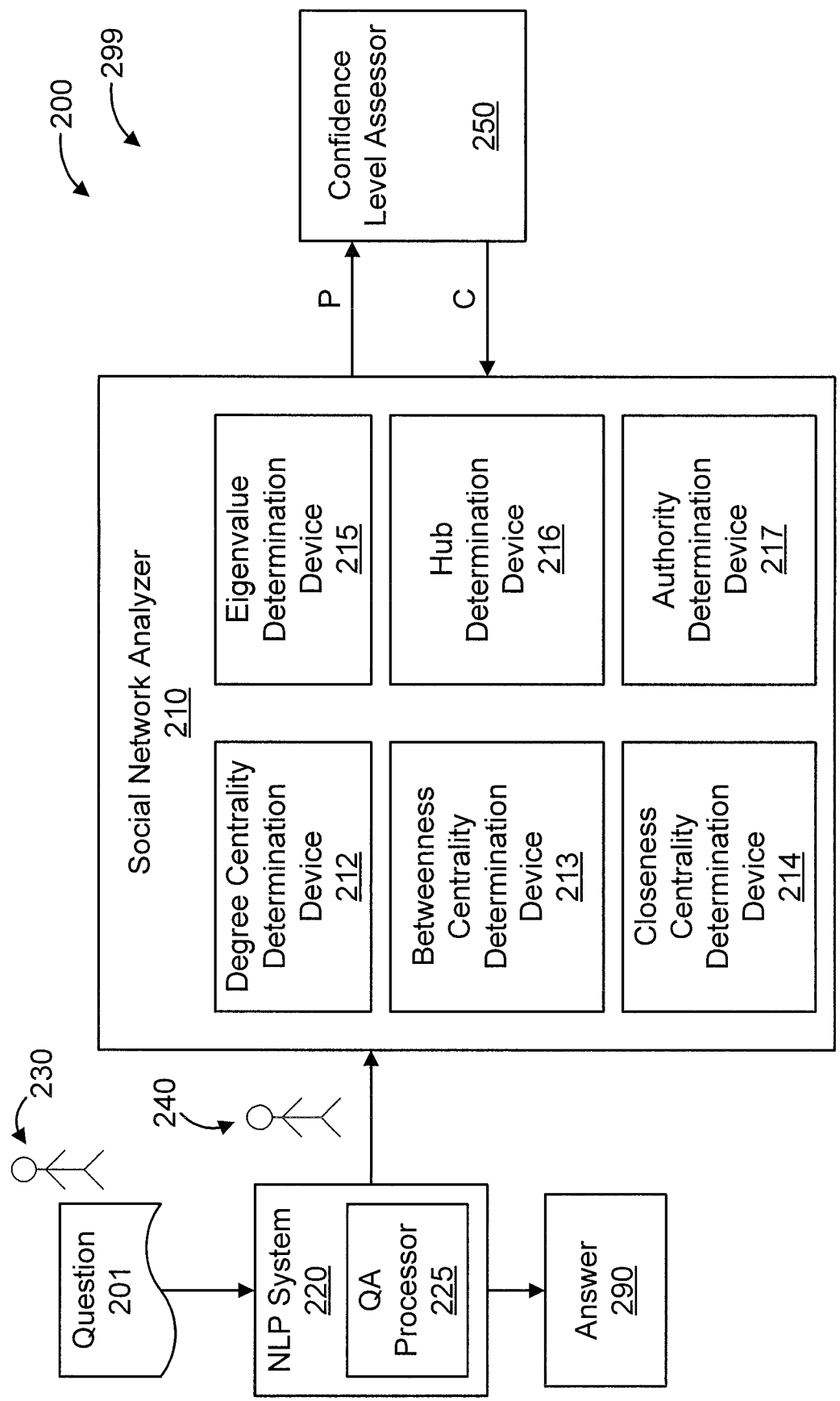
FIG. 2 is a block diagram showing an exemplary question and answer (QA) system 200, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
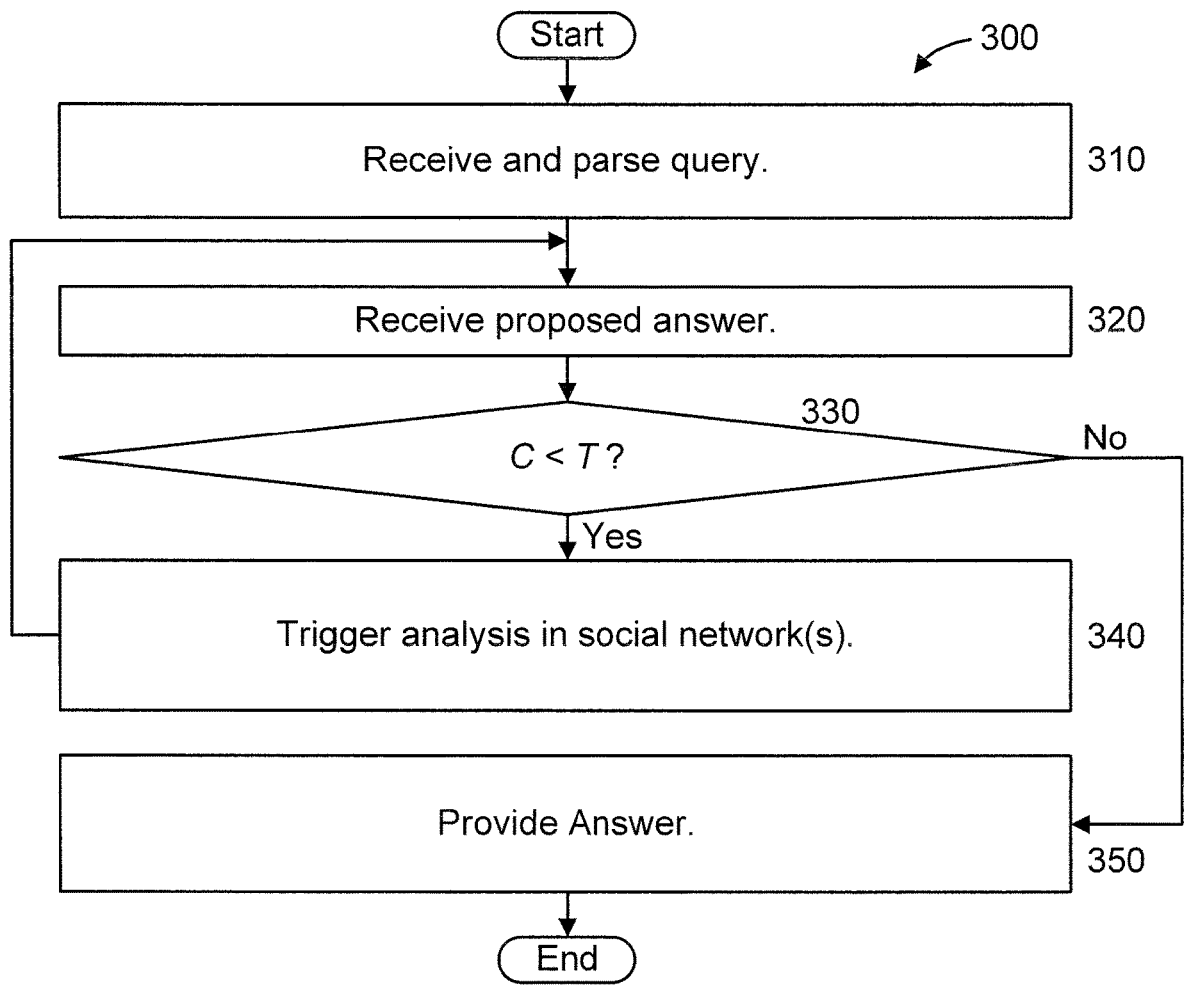
FIG. 3 is a flow diagram showing an exemplary method 300 for optimizing answers provided by QA system, in accordance with an embodiment of the present principles.
Figure 4:
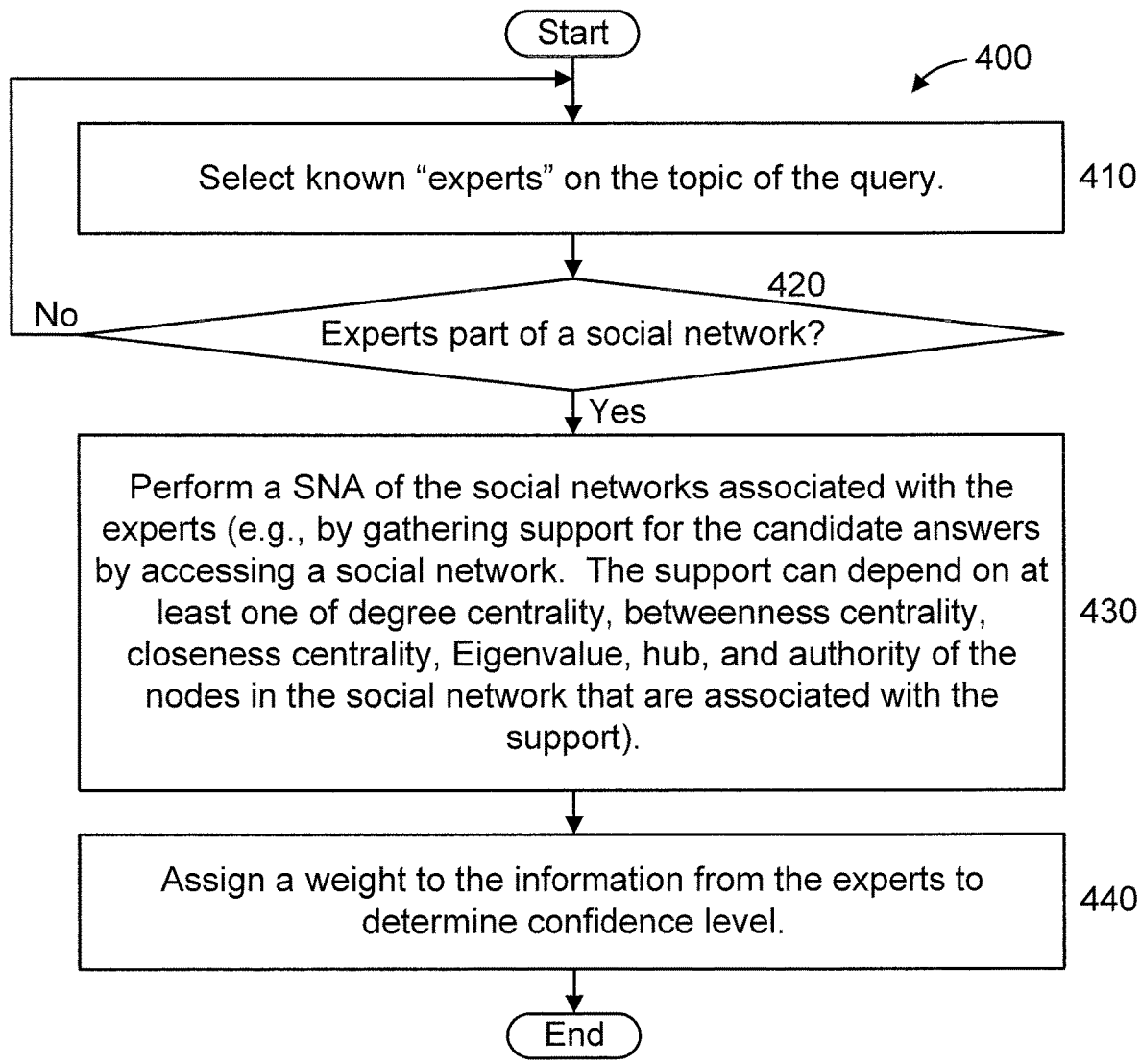
FIG. 4 is a flow diagram further showing step 340 of method 300 of FIG. 3, in accordance with an embodiment of the present principles.
Figure 5:
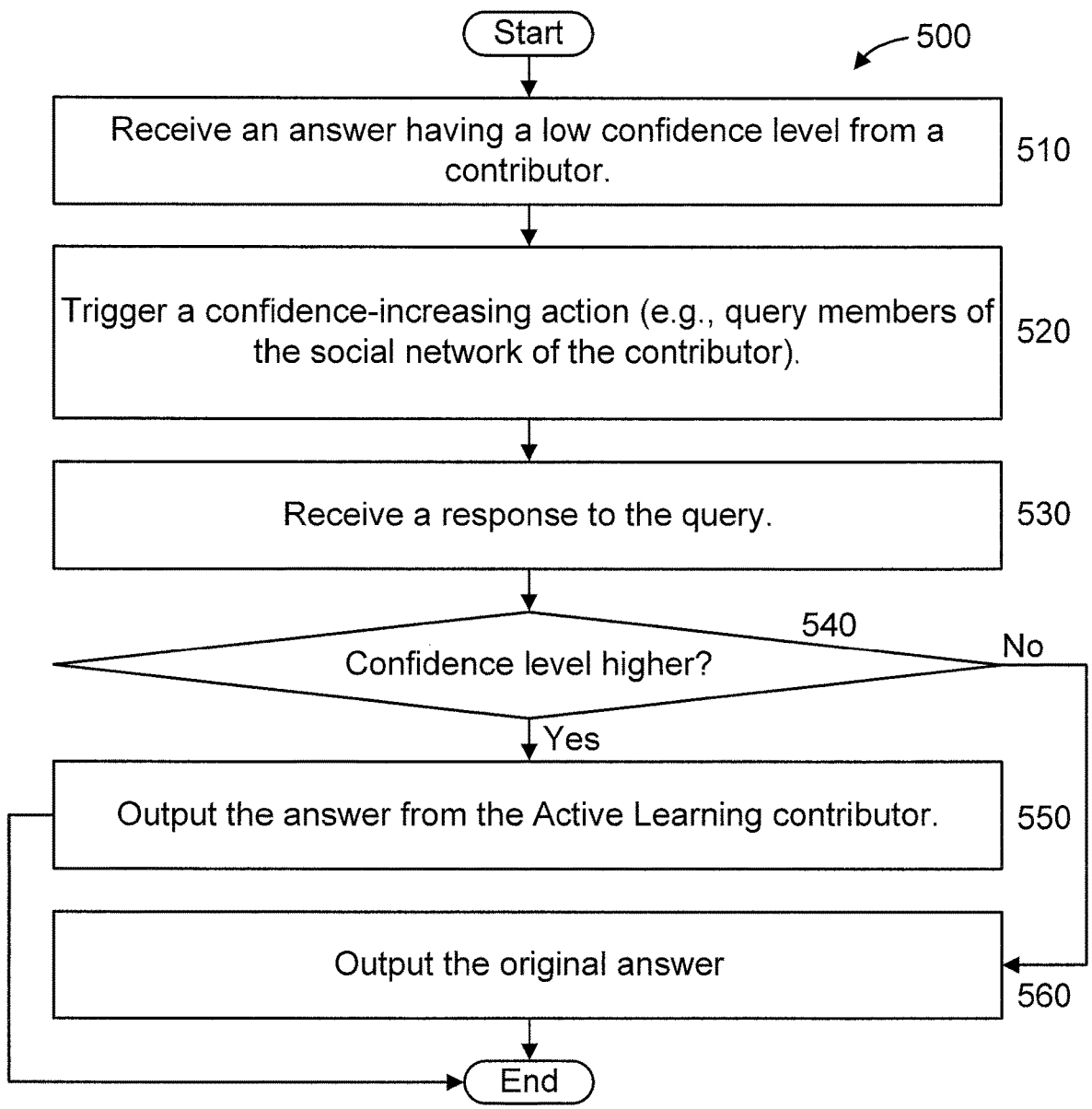
FIG. 5 is flow diagram showing an exemplary method 500 for optimizing answers provided by QA system based on active learning, in accordance with an embodiment of the present principles.
Figure 6:
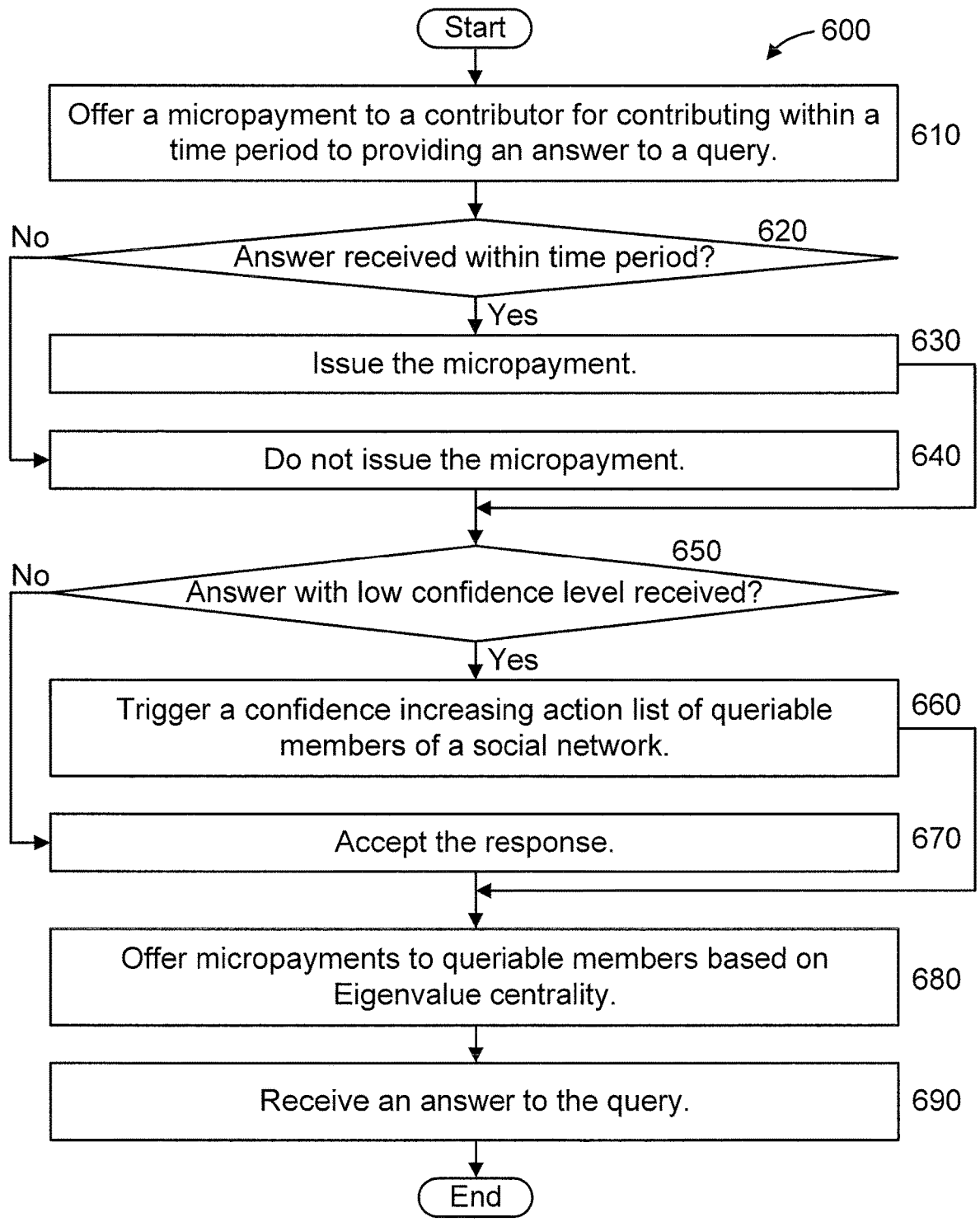
FIG. 6 is a flow diagram showing an exemplary method 600 for computing a price, start time, and deadline associated with soliciting information with respect to social networks and network depth, in accordance with an embodiment of the present principles.

Further, it is to be appreciated that processing system 100 may perform at least part of the method described herein including, for example, at least part of method 300 of FIG. 3 and/or at least part of method 400 of FIG. 4 and/or at least part of method 500 of FIG. 5 and/or at least part of method 600 of FIG. 6. Similarly, part or all of system 200 may be used to perform at least part of method 300 of FIG. 3 and/or at least part of method 400 of FIG. 4 and/or at least part of method 500 of FIG. 5 and/or at least part of method 600 of FIG. 6.

FIG. 2 shows an exemplary question and answer (QA) system 200, in accordance with an embodiment of the present principles. The system 200 includes a NLP system 220, a social network analyzer 210, and a confidence level assessor 250. Various elements of the NLP system 220, the social network analyzer 210, and the confidence level assessor 250 are collectively referred to herein as a NLP-based response optimizer 299.

The NLP system 220 includes a QA processor 225. The NLP system 220 receives a question 201 posed by a Querier 230 and uses natural language processing to provide an answer 290.

The social network analyzer 210 includes a degree centrality device 212, a betweenness centrality device 213, a closeness centrality device 214, an Eigenvalue determination device 215, a hub determination device 216, and an authority determination device 217. The social network analyzer 210 accesses one or more social networks to which one or more experts 240 belong. The degree centrality device 212 determines a degree centrality as described in further detail herein. The betweenness centrality device 213 determines a betweenness centrality as described in further detail herein. The closeness centrality device 214 determines a closeness centrality as described in further detail herein. The Eigenvalue determination device 215 determines an Eigenvalue as described in further detail herein. The hub determination device determines a hub as described in further detail herein. The authority determination device 217 determines an authority as described in further detail herein.

In the embodiment shown in FIG. 2, at least one of the elements of system 200 is processor-based. While the NLP system 220 is shown in this embodiment to include a processor (e.g., QA processor 225), in another embodiment, a different element may include a processor in place of or in addition to the QA processor. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 200 are readily determined by one of ordinary skill in the art, given the teachings of the present principles provided herein, while maintaining the spirit of the present principles.

We describe a system and method to improve the quality and content of answers returned by an online Question Answering (QA) system using natural language processing (NLP). Embodiments of the present principles are proposed that enhance the responses output by QA systems so that the presented information or answers have higher value than that developed by the standard information repository query alone. This enhancement is accomplished using components that are automatically triggered based on criteria.

More particularly, disclosed is a method that employs a NLP QA system, a means for assessing a confidence level for one or more answers in response to a question, and a means for triggering a confidence-increasing action when the confidence level is below a threshold, wherein the confidence-increasing action involves an analysis of content, users, and relationships in a social network (that is, Social Network Analysis (SNA)).

The social network may be based on any of: Facebook®, Twitter®, instant messages, emails, system and event logs, discussions in discussion bulletin boards, and so forth. It is to be appreciated that the preceding listing of social networks and network types are merely illustrative and, thus, the present principles can be applied to other social networks and network types while maintaining the spirit of the present principles.

SNA incorporates multiple metrics to determine the strengths of relationships and information flow within a social network. In one type of SNA, one or more of the following characteristics are assessed to help determine confidence level: degree centrality; betweenness centrality; closeness centrality; Eigenvalue; hub; and authority. In the process of performing such analyses, the method may have consideration of questions such as the following.

(i) Within a network, how highly connected is an entity?
(ii) Within the network, what is the overall importance of the entity?
(iii) Within the network, how central is the entity?
(iv) Within the network, how does information flow?

SNA is a field unto itself and its intricacies are beyond the scope of this disclosure.

In an embodiment of the present invention, we analyze a social network to further weight information that the QA system can already access. The QA system can access centrality measures that clearly show the most central nodes in the network. The QA system can sort by any Social Network Analysis against its database to ascertain if the solution makes sense. For example, presume a user queries a QA system about the characteristics of a part used on a computer board. The QA system performs its algorithms to produce an answer, but has low confidence in this answer. A reason for this low confidence may be that too much contradictory information was found or that many candidate answers were put forth and this answer came out on top by only a small margin.

Whatever the reason, the QA system decides that the confidence level is too low so it then automatically performs a SNA on the social networks of two recognized authorities on the topic and determines that five instant messages have been sent between two experts on this topic within the last day. This information is used to increase the confidence of an answer and then to send the answer to the querent. Let us presume the QA system found answers from two sources considered to be recognized authorities on the topic (based on authorship of books, peer reviewed articles, etc.). But, for whatever reason, the QA system had a low confidence level in the answers (below a predefined threshold) so it delved into the social networks of the two recognized authorities and found experts connected to the recognized authorities. By analyzing the instant messages of the experts, it is determined that the two experts have more direct relationships in the network than other authorities whose answers were considered. The system will now assign a higher weight to the teachings of these two experts on the topic than to the teachings of other authorities in the social network. This is helpful especially when the reason the QA system is uncertain is because of contradictory information available to it.

The following outlines as least some of the invention steps, assuming a QA/NLP system. FIG. 3 is a flow diagram showing an exemplary method 300 for optimizing answers provided by QA system, in accordance with an embodiment of the present principles. Method 300 works in both open and closed domain QA systems.

At step 310, receive a query at a NLP QA system, and parse the query (e.g., decompose into semantic components) to extract its topic. Both the input query and the output answer can be submitted in any of multiple modalities, including text, audio, image, tactile, video, or gesture.

At step 320, submit the query to the QA system and receive at least one response (answer).

At step 330, using known methods, determine whether the confidence level C for the answer(s) is below a predetermined threshold T. If so, then the method proceeds to step 340. Otherwise, the method proceeds to step 350. It is to be noted that the confidence level C being below the threshold T is an indication that the answer provided is likely not optimal.

At step 340, trigger an automatic analysis of information and connections in a social network. The analysis focuses at the social networks of recognized authorities ("experts") on the topic in order to establish how much to weight information available to the Deep QA. The recognized authorities are derived as part of the QA's information retrieval processing Looping back to step 320, after the SNA has been performed per step 340, the QA system may have a higher confidence level in its answer, or perhaps it may have a different answer gleaned from the social network analysis and in step 330 the QA system once again determines if the confidence level C for this answer is less than threshold T. The answer may be derived in one of three ways: (1) by directly extracting information from the social network (e.g., if the question is "Which contemporary musicians are most influenced by the musical style of Lou Reed?" a social network analysis of the topic "Lou Reed" might provide the answer, based solely on connections between different musicians and Lou Reed); (2) by weighting information from other sources, based on analysis of the social network to weight contradictory information from different authors on a topic, based on their degree centrality; or (3) by extracting information from a social network that permits additional active learning queries to individuals connected indirectly to an active learning system through the social network.

At step 350, provide the answer.

Referring now to FIG. 2, we further describe the QA system 200 according to an embodiment of the present principles. As with most systems, there is an input to the system and an output from the system. In this case, the input is the Question 201 posed by the Querier 230 and the output is the Answer 290 provided by the QA system 200. A NLP System 220 with a QA Processor 225 receives the Question 201 and, before providing the Answer 290, communicates with the Social Network Analyzer 210. The Social Network Analyzer 210 can be a wrapper around an existing QA engine or it can be integrated with a QA engine.

The Social Network Analyzer 210 accesses the social network(s) to which the Experts 240 belong to determine the Expert's 240 score in multiple parameters P of social connectivity. Once these social connectivity values are determined, the Confidence Level Assessor 250 computes the Confidence Level C of the likelihood that the Expert 240 can provide an Answer 290 with a high degree of confidence (C>T).

The social-network assessment includes an analysis of one or more of the following confidence level parameters P to help determine and increase confidence level C: (a) degree centrality; (b) betweenness centrality; (c) closeness centrality; (d) Eigenvalue; (e) hub; and (f) authority 217. Also described is the use of social network data for active learning. These confidence level parameters P are explained hereinafter as follows, and are also defined at http://www.f-msasg.com/SocialNetworkAnalysis/.

(a) Degree Centrality. Degree centrality is the number of direct relationships that an entity has. Degree centrality can thus refer to the number of links incident upon a node (i.e., the number of ties that a node has). In the case of a directed network (where ties have direction), we usually define two separate measures of degree centrality, namely indegree and outdegree. Accordingly, indegree is a count of the number of ties directed to the node and outdegree is the number of ties that the node directs to others. An entity with high degree centrality:
i. is generally an active player in the network;
ii. is often a connector or hub in the network;
iii. is not necessarily the most connected entity in the network (an entity may have a large number of relationships, the majority of which point to low-level entities);
iv. may be in an advantaged position in the network;
v. may have alternative avenues to satisfy organizational needs, and consequently may be less dependent on other individuals; and
vi. can often be identified as third parties or deal makers.
(b) Betweenness Centrality. Betweenness centrality identifies an entity's position within a network in terms of its ability to make connections to other pairs or groups in a network. Betweenness centrality can thus refer to the centrality measure of a vertex within a graph. Betweenness centrality quantifies the number of times a node acts as a bridge along the shortest path between two other nodes. An entity with a high betweenness centrality generally:
i. holds a favored or powerful position in the network;
ii. represents a single point of failure—take the single betweenness spanner out of a network and you sever ties between cliques; and
iii. has a greater amount of influence over what happens in a network.
(c) Closeness Centrality. Closeness centrality measures how quickly an entity can access more entities in a network. An entity with a high closeness centrality generally:
i. has quick access to other entities in a network;
ii. has a short path to other entities;
iii. is close to other entities; and
iv. has high visibility as to what is happening in the network.

It is to be noted that if the network includes any entities that are un-linked (i.e. not linked to any other entities), the Closeness Centrality value for all entities in the network is 0.
(d) Eigenvalue. Eigenvalue measures how close an entity is to other highly close entities within a network. In other words, Eigenvalue identifies the most central entities in terms of the global or overall makeup of the network. Eigenvalue is a reasonable measure of one aspect of centrality in terms of positional advantage. A high Eigenvalue indicates that an actor is central to the main pattern of distances among all entities. Eigenvector centrality can thus refer to a measure of the influence of a node in a network.
(e) Hub. Hubs are entities that point to a relatively large number of authorities. They are essentially the mutually reinforcing analogues to authorities. Authorities point to high hubs. Hubs point to high authorities.
(f) Authority. Entities that many other entities point to are called Authorities. In Sentinel Visualizer, relationships are directional, that is, they point from one entity to another. An entity may be considered an authority if the entity has a high number of relationships pointing value, and generally:
i. is a knowledge or organizational authority within a domain.
ii. acts as definitive source of information.

When analyzing the social networks, we attempt to answer the following questions:
i. How highly connected is an entity within a network?
ii. What is an entity's overall importance in a network?
iii. How central is an entity within a network?
iv. How does information flow within a network?

FIG. 4 is a flow diagram further showing step 340 of method 300 of FIG. 3, in accordance with an embodiment of the present principles. Step 340 relates to performing the SNA.

At step 410, select known "experts" on the topic of the query in order to establish how much to weight information available to the QA system. An expert can be a person, university, organization, reference work, website, or other entity. One is considered an expert on a topic based on any one of several indicators. For example, one is considered an expert on a topic if one is the subject of the topic, has authored books on the topic, has authored peer-reviewed articles about the topic, and other factors as readily determined by one of ordinary skill in the art given the teachings of the present principles provided herein, while maintaining the spirit of the present principles. Resuming the above example, let us presume the query is "Which contemporary musicians are most influenced by the musical style of Lou Reed?" After parsing the query we determine that the topic is "Lou Reed". Recognized authorities or experts for this topic will include: Lou Reed himself (now deceased); authors of books by Lou Reed; Lou Reed Fan Clubs; Lou Reed's Facebook® page; and the like.

At step 420, determine if any of the recognized experts are part of a social network. If so, then the method proceeds to step 420. Otherwise, the method returns to step 420.

At step 430, perform a SNA of the social networks associated with the experts. In an embodiment, step 430 can involve and/or otherwise be performed to gather support for the candidate answers by accessing a social network. The support can depend on at least one of degree centrality, betweenness centrality, closeness centrality, Eigenvalue, hub, and authority of the nodes in the social network that are associated with the support. The SNA can include, for example, but is not limited to, analyzing one or more of the following: message content of messages sent and received between members of the social network; message content of instant messages; message timing; social network connectivity; instant message connectivity, and characteristics of users, tools, and systems relating to the social network.

In an embodiment, step 430 can be performed if we uncover social network connections for the topic "Lou Reed". Performing the SNA may lead to an entity connected to the expert who provides more teachings on the topic. Alternatively, the SNA may strengthen the perception that the recognized authority is an expert on the topic and his/her answer should carry a greater weight. For example, the SNA of the example query may uncover social network connections between Lou Reed and other musicians. The strength of these social network connections might be sufficient to answer the query with a high degree of confidence. In addition, examining the content of the social network postings of these other musicians connected to Lou Reed might reveal which one of these musicians was most influenced by Lou Reed's musical style.

At step 440, assign a weight to the information from the experts. The weighting can be important, especially if there appears to be contradictory information from different authorities on a topic. We weight the information from the sources, based on the sources' degree centrality within the social network. The SNA may include any of: an analysis of content of messages passed in a social network; an analysis of social network connectivity; an analysis of timing of messages passed in a social network; an analysis of the characteristics of users in the social network; an analysis of tools and systems on which they run; an analysis of content of messages passed in instant messaging, and/or an analysis of instant messaging connectivity.

A description will now be given regarding active learning, in accordance with one or more embodiments of the present principles.

Active learning, according to Wikipedia.org, is "a special case of semi-supervised machine learning in which a learning algorithm is able to interactively query the user (or some other information source) to obtain the desired outputs at new data points." Therefore the envisioned active learning system to which the QA system is coupled affords the QA system access to authorities on various topics to query for outputs about which it is uncertain (C<T). Using active learning with a QA system 200, an answer is derived by extracting information from a social network that permits additional active learning queries to individuals connected indirectly to an active learning system through the social network. In another embodiment, the QA System 200 may be coupled to an active learning system.

FIG. 5 is flow diagram showing an exemplary method 500 for optimizing answers provided by QA system based on active learning, in accordance with an embodiment of the present principles.

At step 510, receive, by the Social Network Analyzer 210, an answer having a low confidence level from a contributor.

At step 520, trigger a confidence-increasing action. In an embodiment, step 520 involves members of the social network of the contributor being contacted and queried.

At step 530, receive, by the Social Network Analyzer 210, a response to the query, and measure the confidence level of this answer against the threshold in step 540.

At step 540, determine whether the confidence level provided by the active learning contributor is higher than that of the previous answer. If so, then the method proceeds to step 550. Otherwise, the method proceeds to step 560.

At step 550, output the answer from the active learning contributor.

At step 560, output the original answer.

By analyzing the social network of a contributor, the Social Network Analyzer 210 can identify additional potential and valuable contributors that can provide answers to the question or to other questions on the same topic. With this analysis, the active learning component may then establish contact and query members of the contributor's social network who are tightly coupled to that user, to make additional queries and thereby increase confidence. Furthermore, answers in such a system will not be directly relayed without first evaluating them for confidence.

In the current disclosure, we deviate from the known active learning method by using the social network analysis performed by the Social Network Analyzer 210 to allow the Social Network Analyzer 210 to interact with a social network member as a point of contact into a deeper social network where the information the system requires dwells. In this way, the system may not only query a user for the information required to compose an NLP reply to a question posed by the user, but may also, after analyzing a user's social network, suggest how the user may find the required information among members of his or her social network and thereby reply more effectively to the active learning query. We anticipate that the ability of a user to reply to an active learning query by following a NLP/QA system's advice on making inquiries into an existing social network will greatly enhance the active learning the system can perform.

The method conveys an answer to a question in response to the confidence-increasing action.

Also disclosed is a method in which a means is provided to compute a price, start time and deadline associated with soliciting information with respect to social networks and network depth.

In an embodiment, crowd-sourcing, and solicitation of input is guided by analysis of social networks, and can be viewed as directed by expertise ranking, where level of expertise is determined by SNA as described above, and distance to recognized authorities. For example, a higher Eigenvalue indicates that an actor is central to the main pattern of distances among all entities. Eigenvector centrality can thus refer to a measure of the influence of a node in a network. Micro-payments may therefore be scaled according to this measure, for help in labeling certain data for active learning. According to Wikipedia.org, "A micropayment is a financial transaction involving a very small sum of money and usually one that occurs online." For example, whereas Amazon's Mechanical Turk uses an online marketplace to achieve certain crowd-sourcing functions, we provide a way to reward certain individuals for their contributions over others based on SNA. In an embodiment, triggering a confidence-increasing action by querying members of the social network of the contributor may trigger a micropayment. For each suggested member of a social network to query, the Eigenvalue centrality measure indicates the influence of a node in a network. For those with high influence, the micropayment is higher. This payment scaling may also be applied to the original contributor. A time for response may also be calculated for each suggested query into a contributor's social network. Micropayments may therefore be offered for a period of time, and then withdrawn.

FIG. 6 shows a method 600 for making a micropayment, in accordance with an embodiment of the present principles.

At step 610, offer a micropayment to a contributor for contributing within a time period to providing an answer to a query.

At step 620, determine if an answer is received within the time period. If so, then the method proceeds to step 630. Otherwise, the method proceeds to step 640.

At step 630, issue the micropayment.

At step 640, do not issue the micropayment.

At step 650, determine if an answer having a low confidence level is received from a contributor. If so, then the method proceeds to step 670. Otherwise, the method proceeds to step 660.

At step 660, trigger a confidence increasing action list of queriable members of a social network.

At step 670, accept the response.

At step 680, offer micropayments to queriable members based on Eigenvalue centrality.

At step 690, receive an answer to the query.

Thus, in accordance with the embodiment of FIG. 6, a price, start time, and deadline associated with soliciting information from the social network can be determined.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
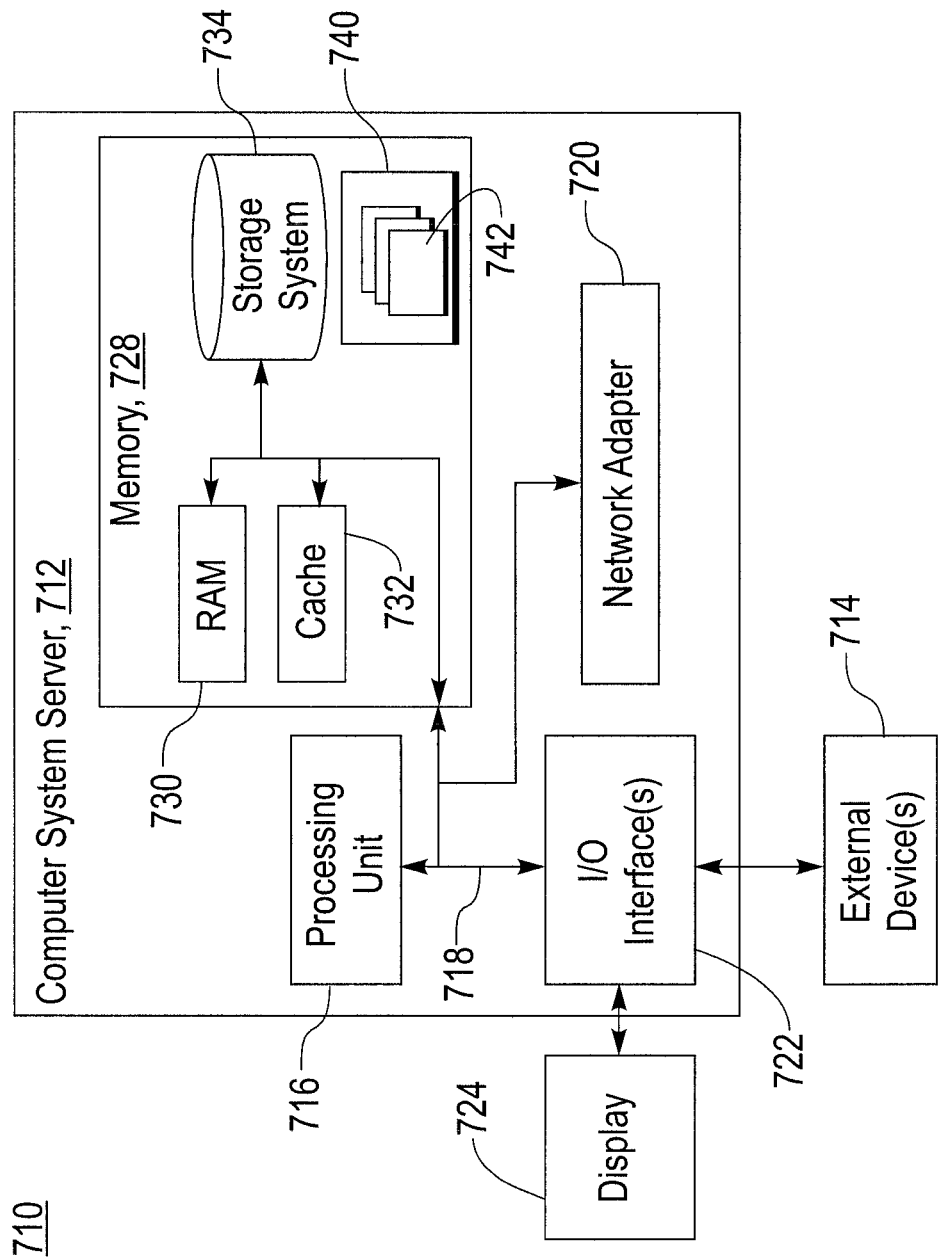
FIG. 7 shows an exemplary cloud computing node 710, in accordance with an embodiment of the present principles.

Referring now to FIG. 7, a schematic of an example of a cloud computing node 710 is shown. Cloud computing node 710 is only one example of a suitable cloud computing node and is not intended to suggest any limitation as to the scope of use or functionality of embodiments of the invention described herein. Regardless, cloud computing node 710 is capable of being implemented and/or performing any of the functionality set forth hereinabove.

In cloud computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in cloud computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

Figure 8:
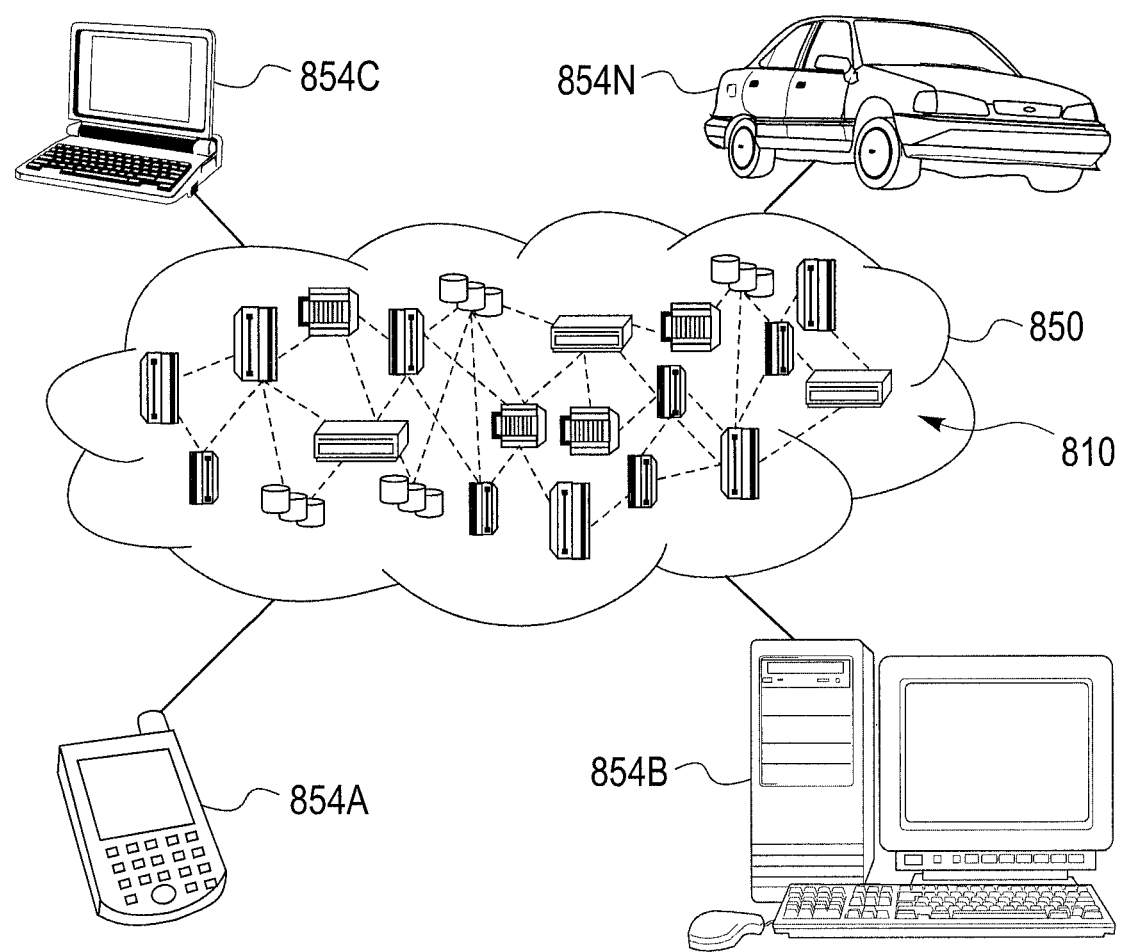
FIG. 8 shows an exemplary cloud computing environment 850, in accordance with an embodiment of the present principles.

Referring now to FIG. 8, illustrative cloud computing environment 850 is depicted. As shown, cloud computing environment 850 comprises one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
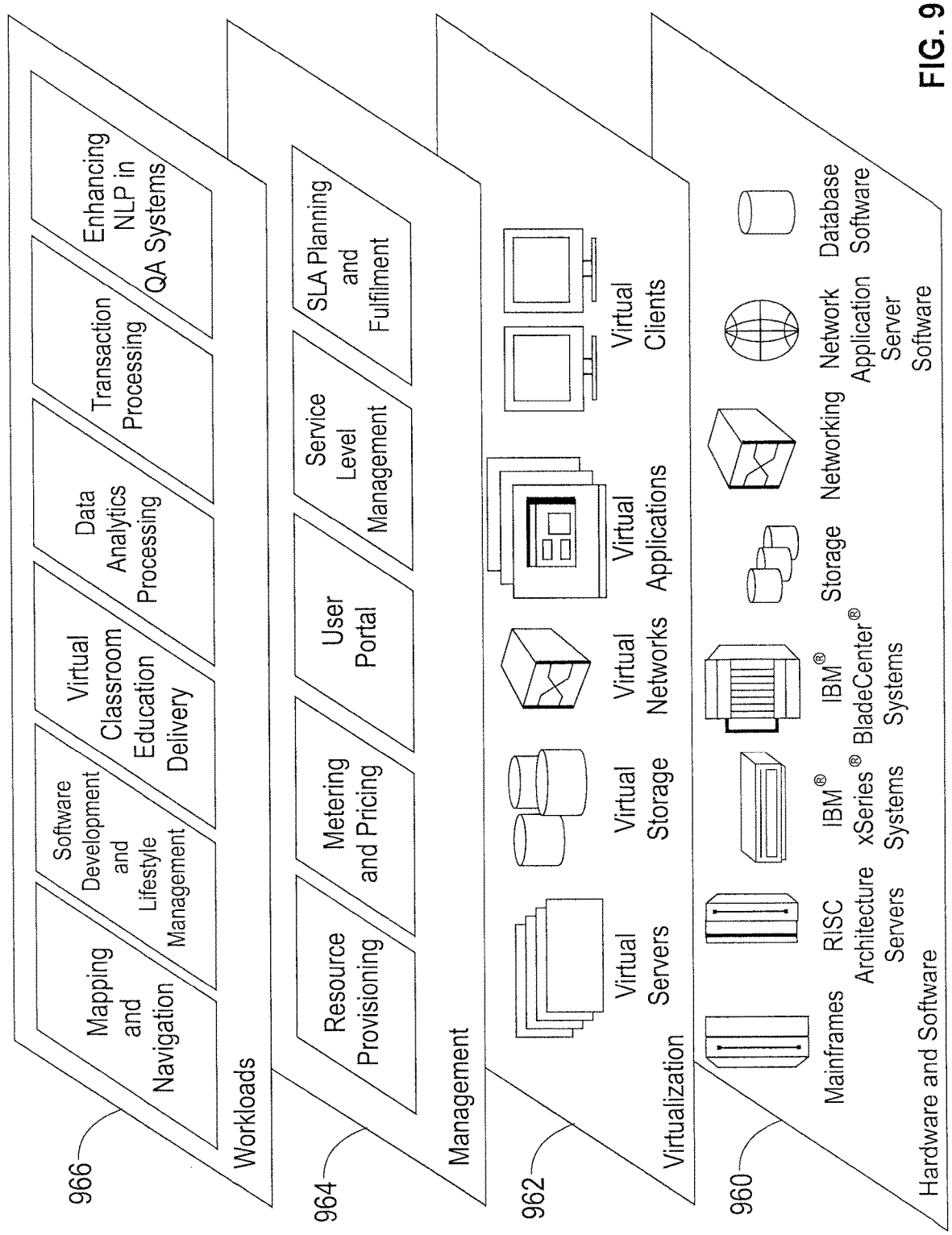
FIG. 9 shows exemplary abstraction model layers, in accordance with an embodiment of the present principles.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 962 provides an abstraction layer from which the following examples of virtual entities may be provided: virtual servers; virtual storage; virtual networks, including virtual private networks; virtual applications and operating systems; and virtual clients.

In one example, management layer 964 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 966 provides examples of functionality for which the cloud computing environment may be utilized. Examples of workloads and functions which may be provided from this layer include: mapping and navigation; software development and lifecycle management; virtual classroom education delivery; data analytics processing; transaction processing; and enhancing natural language processing in QA systems.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method, comprising:
automatically deriving, by a question and answer system using machine learning, an initial candidate answer to an initial question posed in natural language during an online question and answer session, the initial candidate answer having a confidence value;
configuring a transceiver of a computer to access a social network and perform a confidence-increasing action responsive to the initial candidate answer having the confidence value below a threshold confidence value; and
wherein the confidence-increasing action comprises:
performing a supervised learning process by directing active learning to particular nodes from among a plurality of nodes in the social network based on at least one metric of at least one of Eigenvalue and hub of nodes that are associated with support for the initial candidate answer, from among the plurality of nodes in the social network, and wherein the support for the initial candidate answer is gathered from the social network and is weighted by the at least one metric;
receiving other candidate answers to the initial question from contributors of the social network and determining a highest confidence level among the initial candidate answer and the other candidate answers; and
selectively outputting which, if any, of the initial candidate answer and the other candidate answers has the highest confidence level and meets or exceeds the threshold confidence level,
wherein the question and answer system has a different dataset than the social network.

2. The computer-implemented method of claim 1, further comprising computing a price, start time, and deadline associated with soliciting information from the social network.

3. The computer-implemented method of claim 1, further comprising estimating a utility of at least the initial candidate answer with respect to the social network and a network quality.

4. The computer-implemented method of claim 3, wherein the utility of at least the initial candidate answer is estimated based on a quality of past responses.

5. The computer-implemented method of claim 1, wherein the social network comprises at least one of social media accounts, instant messaging accounts, email accounts, system and event logs, and on-line bulletin board discussions.

6. The computer-implemented method of claim 1, wherein the social network comprises at least one social network to which a user that posed the question belongs, and performing the analysis comprises providing a suggestion of how the user can find information for the initial candidate answer from among members of the at least one social network to which the user that posed the question belongs.

7. The computer-implemented method of claim 1, wherein at least the initial candidate answer is derived from one of information directly extracted from a social network, weighting information from multiple sources based on respective degree centralities of the multiple sources derived from an analysis of the social network, and information extracted from the social network that permits additional active learning queries to individuals indirectly connected to an active learning system through the social network.

8. The computer-implemented method of claim 1, further comprising directing active learning to particular nodes from among the plurality of nodes in a social network based on at least one of a degree centrality, a betweenness centrality, a closeness centrality, the Eigenvalue, the hub, and the authority of the nodes in the social network that are associated with the support, wherein directing active learning comprises instructing at least one of the particular nodes on how to seek information from at least one other of the plurality of nodes.

9. The computer-implemented method of claim 1, further comprising gathering support for the initial candidate answer and the other candidate answers from the social network by performing a social network analysis that involves scanning message content in the social network based on discussion context and user-expertise-level, and discovering related information for increasing a confidence level of the candidate answer.

10. The computer-implemented method of claim 1, wherein directing active learning comprises instructing at least one of the particular nodes on how to seek information from at least one other of the plurality of nodes.

11. The computer-implemented method of claim 1, further comprising gathering support for the initial candidate answer and the other candidate answers from the social network, wherein the support is weighted based on at least one metric of at least one of degree centrality, betweenness centrality, closeness centrality, the Eigenvalue, the hub, and the authority of nodes.

12. The computer-implemented method of claim 1, wherein the analysis is performed by analyzing message content in the social network and instant message connectivity.

13. The computer-implemented method of claim 1, wherein the analysis is performed by analyzing message content in the social network and characteristics of users, tools and systems relating to the social network.

14. The computer-implemented method of claim 1, wherein the processor is further configured to generate additional active learning queries to a formulator of the initial question and to individuals connected indirectly to an active learning system through the social network, and wherein the additional active learning queries generated for the formulator of the initial question are configured to elicit additional queries to increase a confidence value of the optimized responses.

15. The computer-implemented method of claim 1, wherein the processor is further configured to generate additional active learning queries to a formulator of the initial question and to individuals connected indirectly to an active learning system through the social network, and wherein the additional active learning queries are in a form of advice to a user in formulating further additional queries.

16. The computer-implemented method of claim 1, further comprising gathering support for the initial candidate answer and the other candidate answers from the social network by performing an analysis of content wherein the support is weighted based on analysis of the social network to weight contradictory information from different authors on a topic, based on their degree centrality.

17. The computer-implemented method of claim 1, further comprising computing another confidence level of a likelihood that an expert can provide one of the other candidate answers with a confidence degree above the threshold confidence level.

18. The computer-implemented method of claim 1, wherein the method further comprises gathering support for the initial candidate answer and the other candidate answers from the social network, and wherein the support is weighted based on Eigenvalue centrality, and wherein a micropayment is made based on the Eigenvalue centrality.

* * * * *